Dec. 15, 1936.  W. W. ROTHENHOEFER  2,064,223
AEROPLANE
Filed June 9, 1934  3 Sheets-Sheet 1
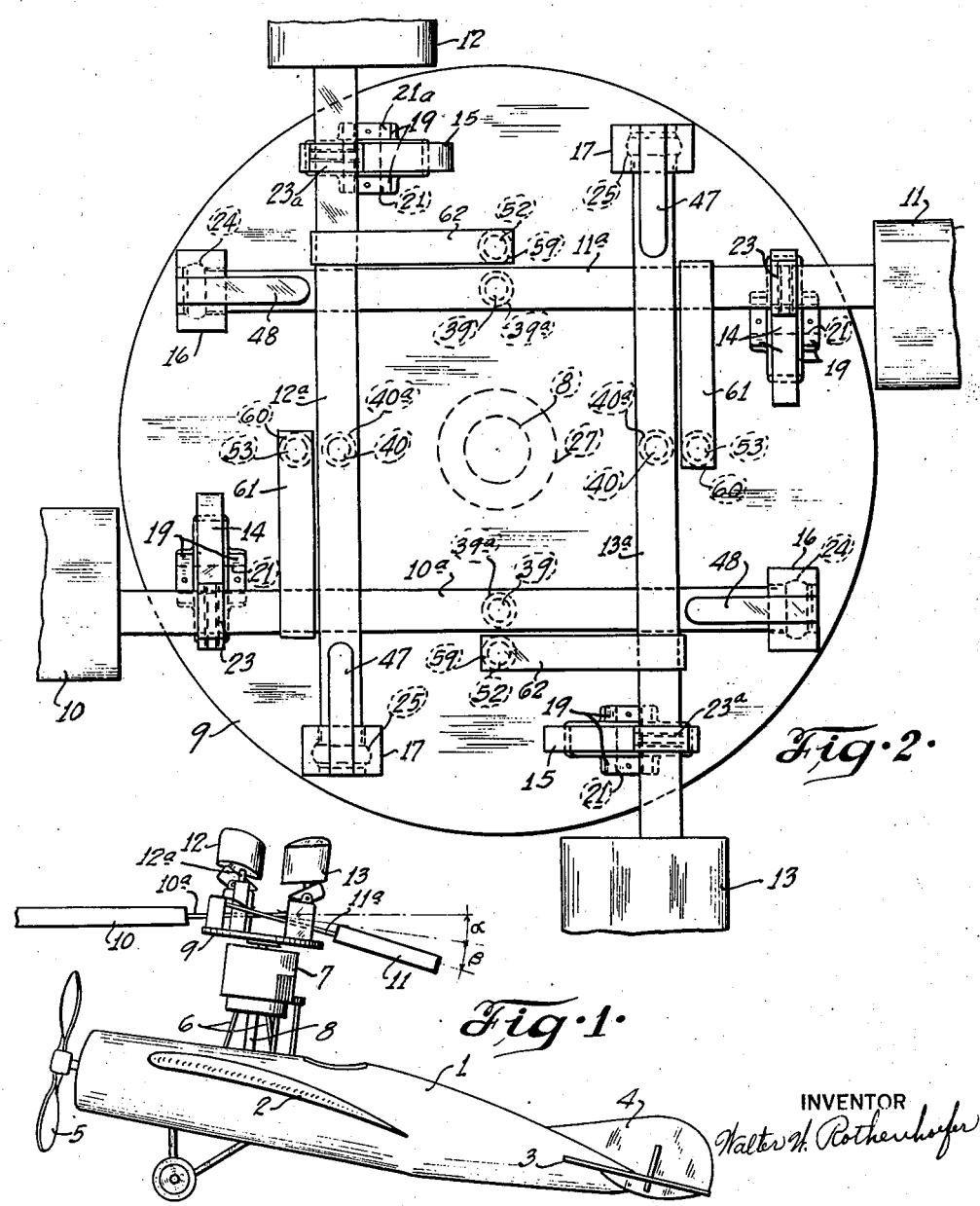
INVENTOR
Walter W. Rothenhoefer Dec. 15, 1936.  W. W. ROTHENHOEFER  2,064,223
AEROPLANE
Filed June 9, 1934   3 Sheets-Sheet 2

Dec. 15, 1936.  W. W. ROTHENHOEFER  2,064,223
AEROPLANE
Filed June 9, 1934   3 Sheets-Sheet 3

INVENTOR
Walter W. Rothenhoefer

Patented Dec. 15, 1936

2,064,223

UNITED STATES PATENT OFFICE 2,064,223

AEROPLANE

Walter W. Rothenhoefer, St. Louis, Mo.

Application June 9, 1934, Serial No. 729,810

9 Claims. (Cl. 244—17)

This invention relates to aeroplanes and particularly to the rotor or sustaining blades in a helicopter type aeroplane.

In previous helicopters the sustaining rotor blades rotate substantially uniformly. It has been suggested to tilt the blades longitudinally, that is, vary the angle between the axis of rotation and the blade axis in order to balance the centrifugal and aerodynamic forces on the blades. In such case all of the blades tilt together and rotate substantially at a uniform level for each adjusted position. The lift applied to the helicopter independently of the forward propeller is dependent upon the rotor blade characteristics such as the surface area, the angle of incidence or pitch, and the power applied to the rotor.

One object of the present invention is to provide a rotor, particularly for helicopters, which is capable of delivering greater power along its axis of rotation than previous rotors as described above.

Another object is to provide novel means for supporting helicopter sustaining blades from the body of the plane.

Another object is to provide a helicopter type aeroplane which is safer to operate than those heretofore developed.

A more detailed object is to provide a helicopter having sustaining blades capable of limited intermittent vertical movement during rotation to increase the lifting capacity thereof.

Another object is to provide novel means functioning both automatically and manually for varying the angle of incidence or pitch of the sustaining blades.

These objects and others hereafter appearing are attained by the structures illustrated in the accompanying drawings in which—

Figure 1 is a side view of an aeroplane embodying the invention.

Figure 2 is an enlarged top view of a portion of the mechanism.

Figure 3:
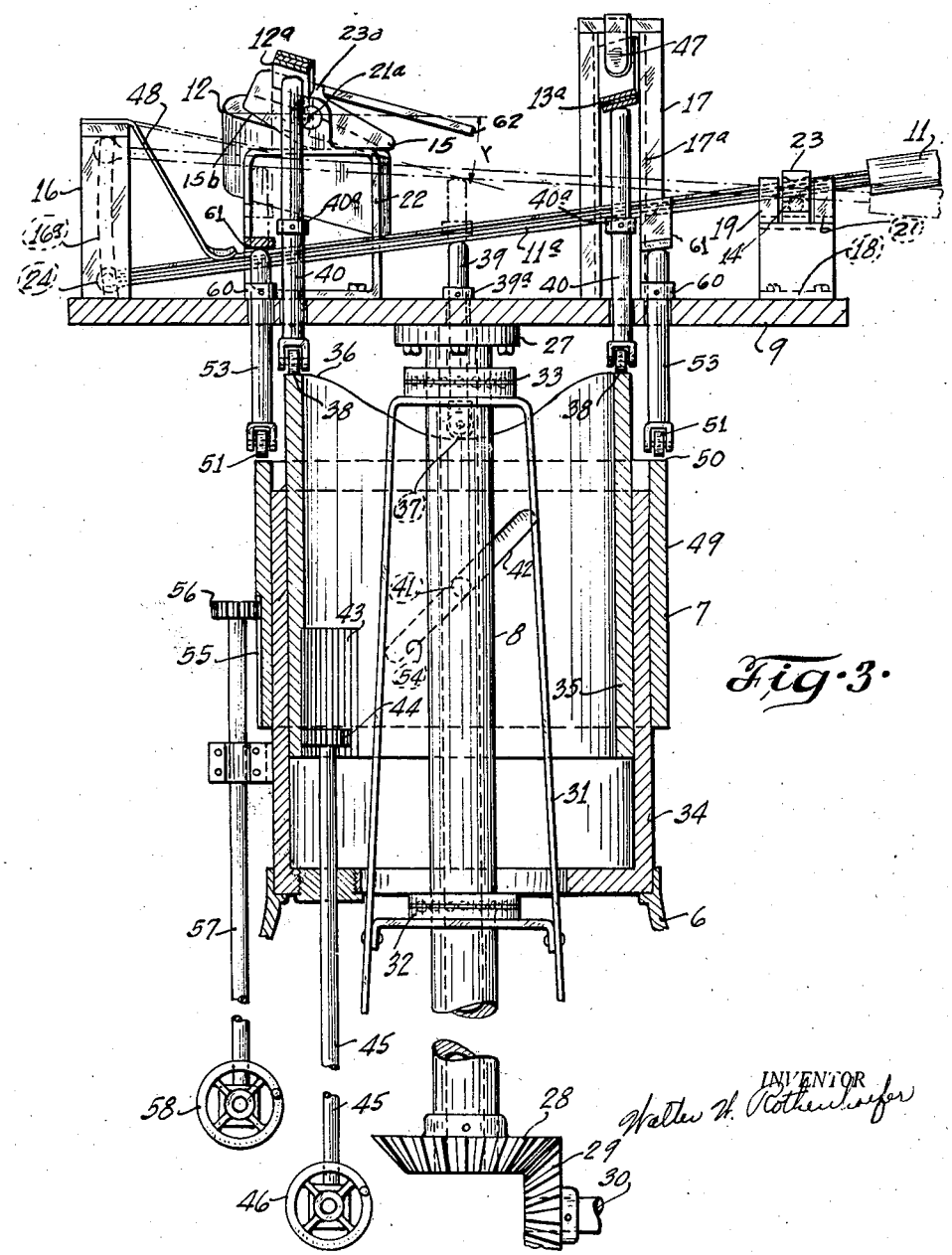
Figures 3 and 4 are vertical sections through the operating turret and showing the parts in different positions.

In Figure 1, the invention is shown applied to an aeroplane having the more or less conventional fuselage 1, wings 2, which may have substantially less span than aeroplanes with forward driving propellers only, tail fins 3 and 4 mounting the usual ailerons and rudder, and screw propeller 5 actuated by a motor encased within the fuselage. Supported above the fuselage on legs 6 is the rotor turret, generally indicated at 7, through which extends the power driven shaft 8 rigid with the plate 9 carrying the sustaining blades 10, 11, 12, and 13 which form the rotor. Propeller 5 and the rotor are preferably operated by the same motor, suitable clutches being provided for selectively actuating the same.

The rotating blades 10, 11, 12, and 13 are formed of relatively long, broad body portions which may be shaped somewhat as aeroplane wings, as shown, and terminate at their inner ends in shank portions 10a, 11a, 12a, and 13a formed of superposed sheet spring leaves and attached to the plate 9 by means of rockers 14 and 15 and brackets 16 and 17. The blades are disposed in oppositely extending pairs 10 and 11 and 12 and 13, the shanks 10a and 11a extending beneath and crossing the shanks 13a and 14a.

Figure 4:
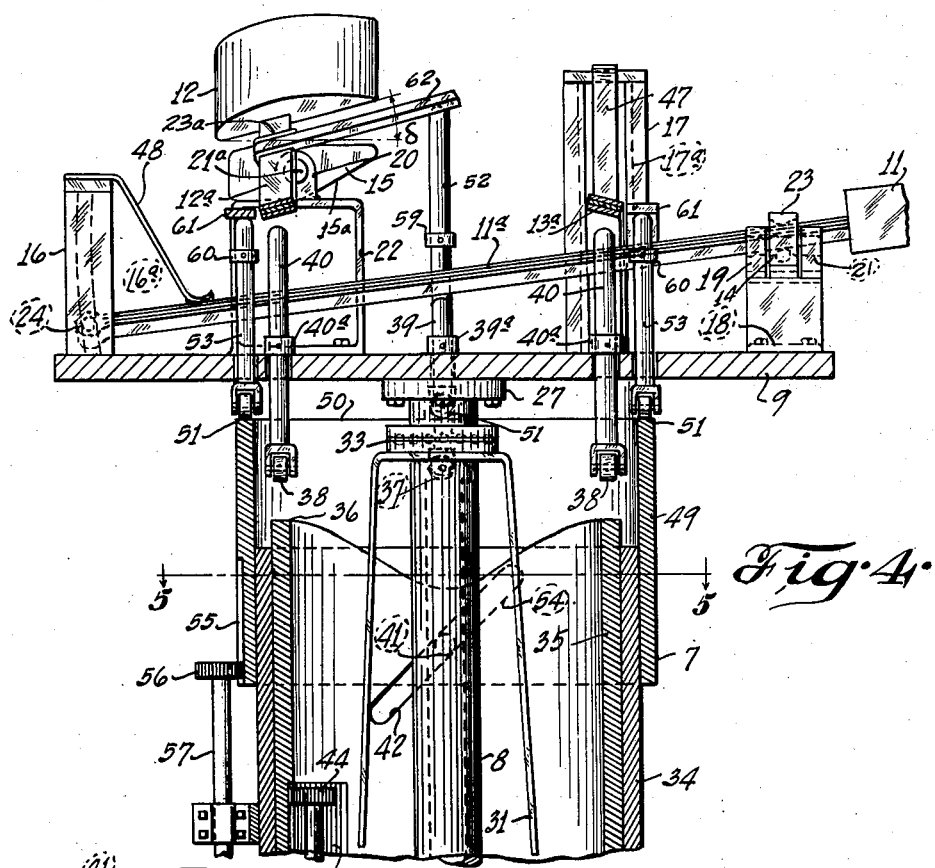
Figure 5:
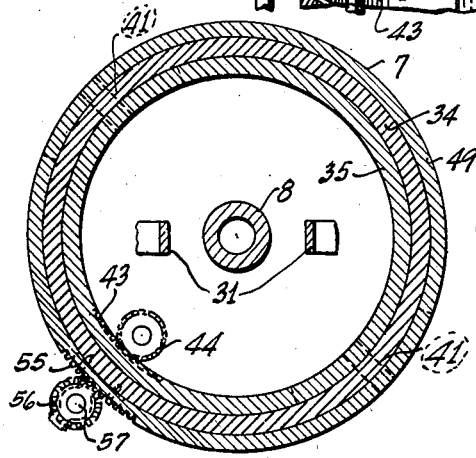
Figure 5 is a horizontal section taken on the line 5—5 of Figure 4.

The rockers 14 and 15 include angularly disposed bottom surfaces corresponding with the surfaces 15a and 15b on rocker 15 in Figures 3 and 4. Each rocker 14 is pivotally carried on a bracket 18, rigidly secured to plate 9, by means of a pin 21 extending between the jaw portions 19 of the bracket. Rockers 15 are each pivoted on a pin 21a extending between the spaced jaws 20 projecting above the elevated bracket 22 secured to plate 9. The rockers 14 and 15 include brackets 23 and 23a pivotally receiving the shank portions of the blades at points adjacent the junctions of these parts.

At their extreme ends the blade shanks have bulbous elements 24 and 25 slidably secured in the brackets 16 and 17. The slots 16a and 17a in said brackets, receiving elements 24 and 25, are shaped as arcs, each described about the corresponding rocker bracket 23 as a center. The rockers function as partial ball joints, permitting rotation of the blades about their longitudinal axes to vary the angles of incidence of the blades, as from the position of the blade 12 in Figure 3 to the position of the same blade in Figure 4, and also permitting longitudinal tilting of the blades about pins 21 and 21a, as indicated by the broken center lines in Figure 1.

The bulbous ends 24 and 25 of the spring shanks are permitted free rotation and sliding within the brackets 16 and 17 during rotation and tilting of the blades. Tilting of the blades is limited by the height of brackets 16 and 17 and the spring shanks 10a, 11a, 12a, and 13a possess sufficient resiliency for the purpose of relieving shocks on these parts due to tilting or flapping of the blades.

The plate 9 may be threaded on or keyed to the vertical operating shaft 8 and the connection is reinforced by a collar 27. Shaft 8 extends downwardly into the fuselage and is connected to the motor through bevel gears 28 and 29, cross shaft 30, and a clutch (not shown). The operating shaft is braced by a support structure 31 projecting above the fuselage and mounting bearings 32 and 33.

Surrounding the shaft 8 is the stationary cylindrical turret support 34 carried on the legs 6. Inside support 34 is the rotatable and vertically slidable cylindrical cam 35 having an undulated upper edge 36 forming a cam race with regular high and low points spaced 90° apart. Engageable with the undulating end 36 are the rollers 37 and 38 journaled on the lower extremities of pins 39 and 40 loosely mounted vertically through the plate 9. Pins 39 and 40 at their upper ends engage the blade shanks and, during rotation of the plate and blades, function as cam followers, reciprocating vertically as they roll around the cam race 36 and causing the blades to tilt longitudinally in alternate pairs. In the present instance, the brackets 16 and 17 are of sufficient length to permit the blades to tilt equally above and below horizontal lines drawn through the rocker pivots, as indicated by the angles α and β in Figure 1.

The tilting or flapping of the blades produces increased lifting power which may be conveniently utilized when the plane is gaining altitude. When it is desired to proceed horizontally, the cam cylinder may be lowered from the operative position shown in Figure 3 to the inoperative position shown in Figure 4 by mechanism including a pin 41 mounted in support 34 and projecting into the inclined slot 42 in the cam 35. On the inner wall of the cam at the bottom are the rack teeth 43 meshing with a pinion 44 rotatable by means of shaft 45 and hand wheel 46 manually operable from the cockpit in the fuselage. Rotation of the cam 35 by the pinion 44 causes the groove 42 to slide up or down along pin 41 and moves the cam up or down as desired. Preferably a pair of pins 41 and grooves 42 will be provided spaced at diametrically opposite points. When the cam 35 is lowered, the pins 39 and 40 hang free on the collars 39a and 40a and the blades will rotate evenly in their highest positions due to the air pressure on the blades. The extent or degree of this tilting of the blades may be further varied in flight by raising or lowering the cam. The blades may be further stabilized in their horizontal flying positions by leaf springs 47 and 48 mounted on brackets 16 and 17 and bearing downward on the ends of the blade shanks as shown.

When power is applied to the plate 9 through shaft 8, rotating the plate clockwise, the resulting horizontal air pressure on the blades will force the rockers 14 and 15 to the position of the rockers shown at 15 in Figure 4 causing the blades to automatically twist on their longitudinal axes and assume the angular position of the blade 12 in Figure 4 in which the angle δ is the angle of incidence, this being the climbing position or the position of ascending pitch.

When the power is shut off or withdrawn from the blades for any reason, permitting the blades to rotate idly, the vertical air pressure on the blades due to falling of the plane will move the rockers to the position of the rocker 15 in Figure 3 in which the bracket 23 is swung upwardly about pin 21a to its highest position. The blades are then in the gliding position, having the negative angle of incidence and a descending pitch.

Outside the cylindrical turret support 34 is a guide or cam cylinder 49 having a straight horizontal upper face 50 engaging rollers 51 journaled on the lower extremities of pins 52 and 53 which are loosely mounted vertically through the plate 9 adjacent the pins 39 and 40. Cylinder 49 is vertically reciprocable by means of inclined slots 54 in its wall slidably receiving portions of the aforesaid pins 41 extending outwardly from support 34, and the rack teeth 55, pinion 56, shaft 57, and hand wheel 58 similar to the operating means for the cam 35. When cylinder 49 is lowered, the pins 52 and 53 hang inoperatively from plate 9 on collars 59 and 60, as in Figure 3. Raising of the cylinder 49 brings pins 52 and 53 into contact with the laterally projecting arms 61 and 62 mounted on the blade shanks whereby the angles of incidence of the blades may be varied by the upward lift on the arms 61 and 62 as will be apparent. It is especially desirable, just before the plane touches the ground, to turn the blades back from the gliding position towards the lift angle so as to cushion the landing.

In operation the blades to a certain extent assume the proper positions for ascent or descent automatically. That is, assuming that the plane is starting to rise and the whole rotor is set in motion, the air pressure on the rapidly rotating blades will cause them to rock "back" on the rockers 14 and 15 so that the blades incline forwardly and upwardly in the direction in which they travel, this being the ascending pitch before referred to and shown for the blade 12 in Figure 3. The blades will also at the same time normally incline upwardly from the horizontal. Manual operation of the hand wheel 46 will then elevate the cam 35 so that the pins 40 striking the "highs" on the undulating upper edge of the cam will cause the blades as they rotate to periodically "flap" downward at their outer ends "packing" the air beneath and giving a great upward lift to the plane in addition to the lift provided by the screw action of the blades. Both the screw action and the flapping action and hence the lift afforded by either or both may be varied at the will of the pilot, the former by raising and lowering the cam cylinder 49 to vary the axial twist or angle of the blades and the latter by raising or lowering the cam 35 and increasing or decreasing the upward and downward motion of the blades. Thus a great range of control is afforded the pilot to meet any conditions of flight and the plane may ascend, descend or hover, as desired. For forward flight the screw propeller 5 is utilized in usual manner. Should the engine of the plane be disabled and the rotor come to a stop in the air the plane will at first descend rapidly and the resulting upward thrust of air will set the rotor in rotation in the opposite direction rocking the blades back to the descending angle of pitch shown for the blade 12 in Figure 4 and then the upward thrust or lift afforded by the blades thus rotating at what is now again an upward and forward inclination (though in the opposite direction) will cause the plane to settle gradually and safely to earth.

Certain features of the invention may be advantageously utilized in other types of rotors or propellers operating in fluids where increased power and flexibility are desirable. The invention is not limited to the exact details illustrated but may be modified as will occur to those skilled in the art and the exclusive use of all such modifications as come within the scope of the appended claims is contemplated.

I claim:

1. In an aeroplane, a rotating support, a blade pivoted thereon about a plurality of axes, a cam race and a cylinder surrounding the axis of rotation of said support, a connection between said cam race and said blade for intermittently varying the angle between the axis of rotation and the axis of said blade during rotation thereof, said cam race being movable towards and away from said support to selectively subject said blade to the influence thereof and withdraw the same therefrom, and a connection between said cylinder and said blade, said cylinder being movable to and from said support to selectively vary the angle of incidence of said blade.

2. A sustaining blade for an aeroplane including an end portion of leaf spring material for attachment to the aeroplane.

3. In a sustaining rotor assembly for aircraft, a rotatable support, power means for rotating said support, a rocker pivotally mounted on the support, and a blade mounted on the rocker whereby the air pressure on the blade as it rotates with the support will automatically vary the angle of incidence of the blade from a rising and sustaining angle to a gliding and sustaining angle when power is withdrawn from the support, and means in addition for manually controlling the angle of incidence of the blade, the same comprising a guide element adjustable axially adjacent the support, an arm extended laterally from the wing, and pins adapted to ride the said guide element and engage the arms to rock the blade on its longitudinal axis.

4. In a sustaining rotor assembly for aircraft, a rotatable support, power means for rotating said support, a plurality of blades pivotally mounted on the support and adapted to twist on their longitudinal axes to vary their angle of incidence in flight, manually controlled means in addition to vary the angle of incidence of the blades, and the said blades being also pivotally mounted to swing upwardly and downwardly at their free ends, means on the support to swing the blades alternately upwardly and downwardly as they rotate to provide a flapping action and manually controlled means for varying the extent of the said flapping action.

5. In a sustaining rotor assembly for aircraft, a rotatable support, a rocker pivotally mounted on the support in a line at right angles to the path of rotation of the support, and a blade pivotally mounted across the rocker in a line parallel with the path of rotation of the support.

6. In a sustaining rotor assembly for aircraft, a rotatable support, a rocker pivotally mounted on the support in a line at right angles to the path of rotation of the support, and a blade pivotally mounted across the rocker in a line parallel with the path of rotation of the support whereby the blade may both twist on its axis and flap upwardly and downwardly at its ends.

7. In a sustaining rotor assembly for aircraft, a rotatable support, a rocker pivotally mounted on the support in a line at right angles to the path of rotation of the support, a blade pivotally mounted across the rocker in a line parallel with the path of rotation of the support whereby the blade may both twist on its axis and flap upwardly and downwardly at its ends, and means for manually and automatically controlling both these movements.

8. In a sustaining rotor for aircraft, a rotatable support, a plurality of blades pivotally mounted at their inner ends on the support in radially and oppositely extended pairs, and means below the said support for periodically and alternately engaging the said blades and flapping them upwardly and downwardly at their outer ends.

9. In a sustaining rotor for aircraft, a rotatable support, a plurality of blades pivotally connected adjacent their inner ends to the supports and radially extended therefrom in opposed pairs, and manually controlled means below the said support for engaging the said blades adjacent their pivotal connections and adapted to periodically flap the said blades upwardly and downwardly at their outer ends as the support rotates.

WALTER W. ROTHENHOEFER.